United States Patent
Singh et al.

(10) Patent No.: US 10,423,703 B1
(45) Date of Patent: Sep. 24, 2019

(54) DETECTION AND RENDERING OF ENDNOTES IN DIGITAL CONTENT

(71) Applicant: Amazon Technologies, Inc., Reno, NV (US)

(72) Inventors: Ashish Singh, Seattle, WA (US); Robert Hale Christensen, Belmont, CA (US); Eric Chen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 602 days.

(21) Appl. No.: 14/316,371

(22) Filed: Jun. 26, 2014

(51) Int. Cl.
   *G06F 17/00* (2019.01)
   *G06F 17/22* (2006.01)
   *G06F 17/24* (2006.01)

(52) U.S. Cl.
   CPC ........ *G06F 17/2235* (2013.01); *G06F 17/241* (2013.01)

(58) Field of Classification Search
   CPC .................................................... G06F 17/241
   See application file for complete search history.

(56) References Cited

U.S. PATENT DOCUMENTS

| | | | | |
|---|---|---|---|---|
| 5,845,303 A * | 12/1998 | Templeman | .......... | G06F 17/248 715/255 |
| 6,199,071 B1 * | 3/2001 | Nielsen | ............. | G06F 17/30882 |
| 6,907,565 B1 * | 6/2005 | Huang | ................ | G06F 17/2247 715/234 |
| 6,971,062 B1 * | 11/2005 | Tolpin | ............... | G06F 17/30861 707/E17.107 |
| 7,401,286 B1 * | 7/2008 | Hendricks | ........... | G06F 17/2235 715/203 |
| 7,493,560 B1 * | 2/2009 | Kipnes | .................... | G06F 9/453 715/729 |
| 8,522,141 B2 * | 8/2013 | Yoon | .................... | G06F 17/2235 715/200 |
| 8,903,759 B2 * | 12/2014 | King | ...................... | G06F 17/241 707/600 |
| 9,131,339 B1 * | 9/2015 | Kulfan | ..................... | H04W 4/02 |
| 9,489,853 B2 * | 11/2016 | Sherman | .................. | G09B 5/00 |
| 9,501,530 B1 * | 11/2016 | Jacobsson | ......... | G06F 17/30958 |
| 2002/0073177 A1 * | 6/2002 | Clark | ....................... | G06F 21/10 709/219 |
| 2002/0152238 A1 * | 10/2002 | Hayes | ............... | G06F 17/30855 715/240 |
| 2003/0002086 A1 * | 1/2003 | Thomason | .............. | G06F 16/93 358/448 |
| 2004/0193902 A1 * | 9/2004 | Vogler | .................... | G06F 21/10 713/193 |
| 2006/0120522 A1 * | 6/2006 | Clark | ...................... | G06F 21/10 380/201 |

(Continued)

*Primary Examiner* — Laurie A Ries
(74) *Attorney, Agent, or Firm* — Eversheds Sutherland (US) LLP (57) ABSTRACT

Systems, methods, and computer-readable media are disclosed for detecting and rendering endnotes in digital content. A user selection of a link rendered at a first location in digital content may be detected and various filtering criteria may be evaluated to determine whether the link references a second location in the digital content that is associated with endnote content. If the link is determined to reference endnote content, the endnote content may be extracted and rendered in association with a portion of the digital content corresponding to the first location.

22 Claims, 5 Drawing Sheets

(56) References Cited

U.S. PATENT DOCUMENTS

| | | | |
|---|---|---|---|
| 2007/0204211 A1* | 8/2007 | Paxson | G06F 17/2229 715/205 |
| 2011/0191328 A1* | 8/2011 | Vernon | G11B 27/034 707/723 |
| 2011/0261030 A1* | 10/2011 | Bullock | G06F 15/0283 345/204 |
| 2012/0173578 A1* | 7/2012 | Cheong | G06F 17/30014 707/780 |
| 2013/0088511 A1* | 4/2013 | Mitra | G06F 3/0483 345/629 |
| 2013/0227398 A1* | 8/2013 | Bolstad | G06F 17/212 715/236 |
| 2016/0057458 A1* | 2/2016 | Kaiser | G06F 3/048 725/32 |
| 2017/0041494 A1* | 2/2017 | Femandes | G06F 3/1206 |
| 2017/0090699 A1* | 3/2017 | Pennington | G06F 1/1616 |
| 2018/0181271 A1* | 6/2018 | Behar | G06F 1/162 |
| 2018/0241840 A1* | 8/2018 | Hasek | H04W 4/02 |

\* cited by examiner

DETECTION AND RENDERING OF ENDNOTES IN DIGITAL CONTENT

BACKGROUND

The number of people consuming digital content continues to grow, spurred on by the increasing breadth of content available in digital form and the continual improvements in data transmission speeds and device portability. For example, an increasing number of people now consume electronic books ("e-books") in lieu of or in addition to traditional print equivalents. E-books generally consist of digital content including text, images, or the like. E-book content may also include links that, responsive to user selection, direct users to different portions of the e-book or to other content sources such as web sites.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

This disclosure relates to, among other things, systems, methods, computer-readable media, techniques, and methodologies for determining that first content is linked to second content which is, in turn, linked to the first content and rendering the second content in association with the first content. In certain example embodiments, the first content may be a first portion of digital content and the second content may be a second portion of the digital content. The second portion of the digital content may include content that supplements the first portion of the digital content. For example, the supplemental content may include endnote or footnote content that is referenced by a link included in the first portion of digital content. The terms "supplemental," "auxiliary," "secondary," or the like, may be used interchangeably herein. Further, the terms "endnote" and "footnote" may also be used interchangeably herein. Various filtering criteria may be evaluated to determine whether a link in digital content references supplemental content in the digital content, and if so determined, the supplemental content may be extracted and rendered. The supplemental content may be rendered in a manner that maintains a current context for a user. For example, the supplemental content may be rendered as an overlay on the first portion of the digital content.

Digital content may include any type of content that exists in the form of digital data and which is capable of being consumed. Example types of digital content may include, without limitation, electronic books or other electronic publications ("e-books"), Internet content, or the like. Digital content may include text content, graphical content, audio content, video content, or the like, and may include information that is digitally broadcast, streamed, or contained in computer files. While example embodiments of the disclosure may be described in the context of e-books, it should be appreciated that the disclosure is more broadly applicable to any form of digital content. Further, while example embodiments of the disclosure may describe supplemental content as endnote content, it should be appreciated that supplemental content may include any portion of digital content that is linked to and from another portion of the digital content, content that is linked to and from a portion of digital content but independent therefrom, and so forth.

In an example embodiment of the disclosure, an e-book may be accessed on a user device such as, for example, a smartphone device, a tablet device, an electronic reader device ("e-reader"), or the like. Upon accessing the e-book, a portion of the e-book content may be rendered on a display of the device. The user device may provide a capability (e.g., a pagination capability) to transition through the e-book such that additional portions of the e-book content are rendered on the display. This capability may be provided responsive to actuation of physical buttons of the device, responsive to a touch or other gesture applied to a touch-sensitive display of the device, responsive to a voice command, or the like.

A portion of the e-book content rendered on a display of a device may include one or more links. A link may point to another portion of the e-book content such as, for example, a start position of a particular section of the content (e.g., a new chapter or section), an index, a table of contents, an endnote, or the like. Alternatively, a link may point to another content source such as a web site. A link may be rendered in any suitable manner such as, for example, as a superscript or subscript associated with text content, as a portion of text content, or the like. Various indicia may be rendered to indicate to a user that a link is present and selectable. For example, a superscript or subscript corresponding to a link, linked text, or the like may be underlined and rendered in a different color in order to distinguish it as a link.

A user may select a link in any suitable manner depending on the capabilities of the device. For example, a user may actuate physical cursor buttons of the device to navigate to and select the link. If the device includes a touch-sensitive display, the user may apply a touch or other gesture to the device to select the link. In accordance with example embodiments of the disclosure, responsive to detection of a user selection of a link rendered at a first location in an e-book, algorithmic processing may be triggered for determining whether the link references endnote content. Alternatively, the algorithmic processing may occur at least partially concurrently with rendering of digital content that includes the link, and thus, user selection of the link may not be required to trigger the algorithmic processing.

A location in digital content (e.g., an e-book) may correspond to a portion of the digital content such as, for example, a block of data that may include one or more characters, symbols, spaces, endnote markers, or any other suitable content elements. A location may be derived from a corresponding position. A position in digital content (e.g., e-book content) may refer to an internal representation of the content. For example, a position may correspond to a byte (or other unit) of data. A position may be translated or converted to a location using one or more conversion operations that may include a formulaic manipulation of the position to obtain the corresponding location. For certain types of characters (e.g., single-byte characters), in certain example embodiments, a single position associated with a character may translate to a single corresponding location of the character. For certain other types of characters (e.g., multi-byte characters), in certain example embodiments, multiple positions associated with a character may translate to a single corresponding location of the character. It should be appreciated, however, that a location may include a block of data (e.g., 128 bytes) that may correspond to multiple characters, symbols, or other content elements.

Any particular location in digital content may be represented as an offset from a reference location thereby defining a predetermined sequence for the locations. For example, a particular location in an e-book may be assigned a particular value, and adjacent locations may be assigned an incremented or decremented value. Accordingly, the locations of an e-book and the associated values may reflect an ordering of the content of the e-book which may, in turn, correspond to the order in which content would be presented in a print equivalent. For example, assuming that a particular location has a value of 50, then a subsequent location that is immediately adjacent to that location may have a value of 51 such that a user transitioning through the e-book in sequential order, would encounter content associated with location 51 after location 50. An e-book, for example, may include multiple locations. Therefore, depending on the size of a display of a device, font size, formatting, or the like, the content associated with a particular location may be rendered across multiple screen images.

The algorithmic processing to determine whether a selected link references an endnote may include an initial determination of a second location to which the link points. In certain example embodiments, the processing may include making a call to a rendering engine which may, in turn, provide a response that identifies the second location to which the link points. If the link points to a content source other than the e-book content (e.g., a web site), the processing may halt, and a determination may be made that the link does not reference an endnote. If, however, the second location is a location in the e-book, the algorithmic processing may proceed by determining whether the second location includes a back link that points to the first location or to a "nearby" location (e.g., another location in the e-book that is within a threshold number of locations from the first location). The threshold number may be chosen as a function of the language of the e-book, a subject matter or genre to which the e-book relates, or the like. If the second location does not include a back link that points to the first location or a "nearby" location, the processing may halt, and a determination may be made that the link does not reference an endnote. If, however, the second location does include such a back link, then the link may be referencing a potential candidate endnote, and further processing may be performed to evaluate one or more filtering criteria to determine whether the content that the link is referencing is an endnote. It should be appreciated that, in certain example embodiments, if a location that is within a threshold number of locations from the second location includes a back link as described above, then a determination may be made that the selected link references a potential candidate endnote, even if the second location itself does not include the back link.

In those example embodiments in which a first link points to a location that includes a back link, and the back link, in turn, points to a location within a threshold number of locations of a location corresponding to the first link, the combination of the first link and the back link may be referred to as a pair of related links. In those example embodiments in which the back link points to the location that corresponds to the first link, the combination of the first link and the back link may be referred to as a cyclic link. Accordingly, algorithmic processing for evaluating filtering criteria may be triggered in response to the detection of a pair of related links (which may, in certain example embodiments, be a cyclic link). A link and a back link that together form a pair of related links may also be referred to herein as a "first link" and a "second link," respectively. It should be appreciated that the terms "first," "second," or "cyclic" are not limiting and are used solely for ease of explanation.

The filtering criteria may include various criteria that may be evaluated to determine whether a first link references endnote content or, potentially, other content in the e-book or other content that is independent of the e-book. An example filtering criterion may include whether a first location (that includes a first link that was selected) is before a second location. As described earlier, the second location may be a location to which the first link points and that includes or is "nearby" to a second link that points to the first location or a "nearby" location. If the first location is before the second location, it may be determined that the first link references a potential candidate endnote. If, however, the first location is not before the second location, it may be determined that the first link does not reference endnote content.

In example embodiments of the disclosure, endnotes may be provided at locations towards the end of an e-book or at locations towards the end of a particular section of the e-book (e.g., a chapter), and links that reference the endnotes may be provided at earlier locations. Accordingly, if the first location is not less than the second location—meaning that the second location occurs before the first location in the e-book—it may be determined that the first link is not referencing endnote content. In such scenarios, the first link may be referencing other content in the e-book instead (e.g., the start of an earlier chapter or section, a table of contents, earlier e-book content generally, etc.).

Additional filtering criteria that may be assessed to determine whether the first link is referencing endnote content may include whether a number of consecutive links in the vicinity of the first link meets or exceeds a first threshold value or whether a number of consecutive links in the vicinity of the second link (the back link) meets or exceeds a second threshold value. The first and second threshold values may be selected based on the language of the e-book, the subject matter or genre to which the e-book relates, or the like, and may be the same value or different values. The "vicinity" of a link may include the location of the link and one or more adjacent locations before or after the location of the link. If a number of consecutive links in the vicinity of the first link is greater than or equal to the first threshold value or the number of consecutive links in the vicinity of the second link is greater than or equal to the second threshold value, the processing may halt, and a determination may be made that the first link does not reference endnote content. On the other hand, if a respective threshold number of consecutive links is not present in the vicinity of the first link and not present in the vicinity of the second link, a determination may be made that the first link continues to reference a potential candidate endnote.

If the number of consecutive links in the vicinity of the first link is greater than or equal to the first threshold value, the first link may be part of a table of contents of the e-book, and thus, may point to the start of a new chapter or section. Similarly, if the number of consecutive links in the vicinity of the second link is greater than or equal to the second threshold value, the second link may be part of an index of the e-book. In certain example embodiments, a set of consecutive links may include a series of links that appear together without any other intervening e-book content. In other example embodiments, two links may be considered to be consecutive even if other e-book content exists between the links. It should be appreciated that if it is determined that the number of consecutive links in the vicinity of the first link meets or exceeds the first threshold value, and thus, that the first link does not reference endnote content, the corresponding check with respect to the second link may not be performed, or vice versa.

Additional filtering criteria that may be assessed may include, without limitation, whether the first link (or the first location) is included in a Navigational Control (NCX) file, whether the first location is before a start reading location of the e-book, and/or whether the second location is associated with a chapter start marker of the e-book. An NCX file may specify table of contents data, data identifying various sections of the e-book (e.g., chapters), or the like. In certain example embodiments, if each of the filtering criteria mentioned earlier as well as each of the additional filtering criteria mentioned above are satisfied, it may be determined that the first link references endnote content. Conversely, if any of the above-mentioned filtering criteria are not satisfied, a determination may be made that the first link does not reference endnote content. It should be appreciated that all of the example filtering criteria discussed above may not be evaluated in all embodiments of the disclosure. Similarly, additional filtering criteria beyond those mentioned above may also be evaluated.

If, after an evaluation of filtering criteria, it is determined that the first link references endnote content, a process to identify the endnote content may be initiated. While the term "extraction" may be used herein in connection with a description of the process for identifying the endnote content, use of this term shall not be deemed limiting in any way. For example, "extraction" of the endnote content may or may not include removal of the endnote content from the one or more locations that include the endnote content. In certain example embodiments, extraction of the endnote content may begin at a start position associated with the second location. The extraction process may continue until a halt condition occurs, at which point, the extraction process may cease. Any of a variety of halt conditions may trigger a cessation of the endnote content extraction. For example, if during the endnote content extraction, another cyclic link or a link forming part of a pair of non-cyclic but related links is encountered, the extraction may cease. The algorithmic process described above may be executed to determine whether a link that is encountered forms part of a cyclic link or otherwise part of a pair of related links. As another non-limiting example, the endnote content extraction may cease if a page break is encountered. A page break may be defined in the content of an e-book and may indicate an end to the current context. Page breaks may serve as halt conditions in those scenarios, for example, where NCX data is not provided for the e-book. As yet another non-limiting example, the endnote content extraction may cease if a new section or chapter of the e-book is encountered. For example, if a new entry is encountered in the NCX data that indicates the start of a new chapter or section, this may indicate that the current context has ended, and the endnote content extraction may cease. As still another non-limiting example, the endnote content extraction may cease if an extraction limit is reached. The extraction limit may be a threshold number of characters (e.g., 2000 characters) that can be extracted or a threshold number of locations (e.g., 200 locations) across which the endnote content is extracted.

Once the endnote content has been extracted, it may be rendered in association with current content rendered on a display of the device. The current content may include the first link (the link that was selected) as well as other e-book content associated with the first location and/or one or more other locations. For example, the endnote content may be rendered as an overlay over content that has already been rendered. For example, the endnote content may be rendered in a pop-up window, dialog box, or the like. A mechanism may be provided for closing the overlay, thereby returning the user to the content that was previously rendered. In this manner, a current context may be maintained without having to redirect the user to the second location to render the endnote content.

In certain example embodiments, a link may be rendered in connection with the rendered endnote content that, responsive to selection, causes a user to be redirected to the second location that includes the endnote content. For example, in certain example embodiments, the endnote content may include partial endnote content if, for example, a character limit for extraction was reached before the entire endnote content was extracted. Selection of the link described above may redirect the user to the second location and allow the user to view the entire endnote content including that portion that may not have been rendered in the overlay.

In addition, in various example embodiments, a mechanism may be provided for allowing the user to scroll through the endnote content. For example, if a device includes a touch-sensitive display, a user may scroll through the endnote content by applying a gesture (e.g., a swipe) to the display. Additionally, or alternatively, a scroll bar or the like may be provided that allows for free-form scrolling through the endnote content.

Example embodiments of the disclosure provide a number of advantages or technical effects. For example, in accordance with example embodiments of the disclosure, the algorithmic processing described herein may be performed at least partially concurrently with a rendering of content (e.g., a rendering of content referenced by a selected link or a rendering of content that includes the selected link), thereby obviating the need to consult metadata associated with an e-book, sidecar files, or the like, to determine whether a link references endnote content or other content that may be rendered without having to redirect a user away from a current location in digital content. Further, as part of the algorithmic processing disclosed herein, various filtering criteria may be evaluated to increase the likelihood that content referenced by a selected link is, in fact, endnote content or other content that may be rendered without having to redirect a user away from a current location in digital content, prior to initiating extraction of such content. In addition, once extracted, the endnote content (or other content referenced by a selected link) may be rendered in an overlay over existing content rendered on the display of the device in a manner that allows the user to consume the endnote content if desired and remove the endnote content from the display and return to the existing content. Thus, the likelihood that a user is directed to another location in the e-book through an inadvertent gesture (e.g., an inadvertent selection of a link) is eliminated. It should be appreciated that the above examples of advantages and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Use Cases and Device Architecture

Figure 1:
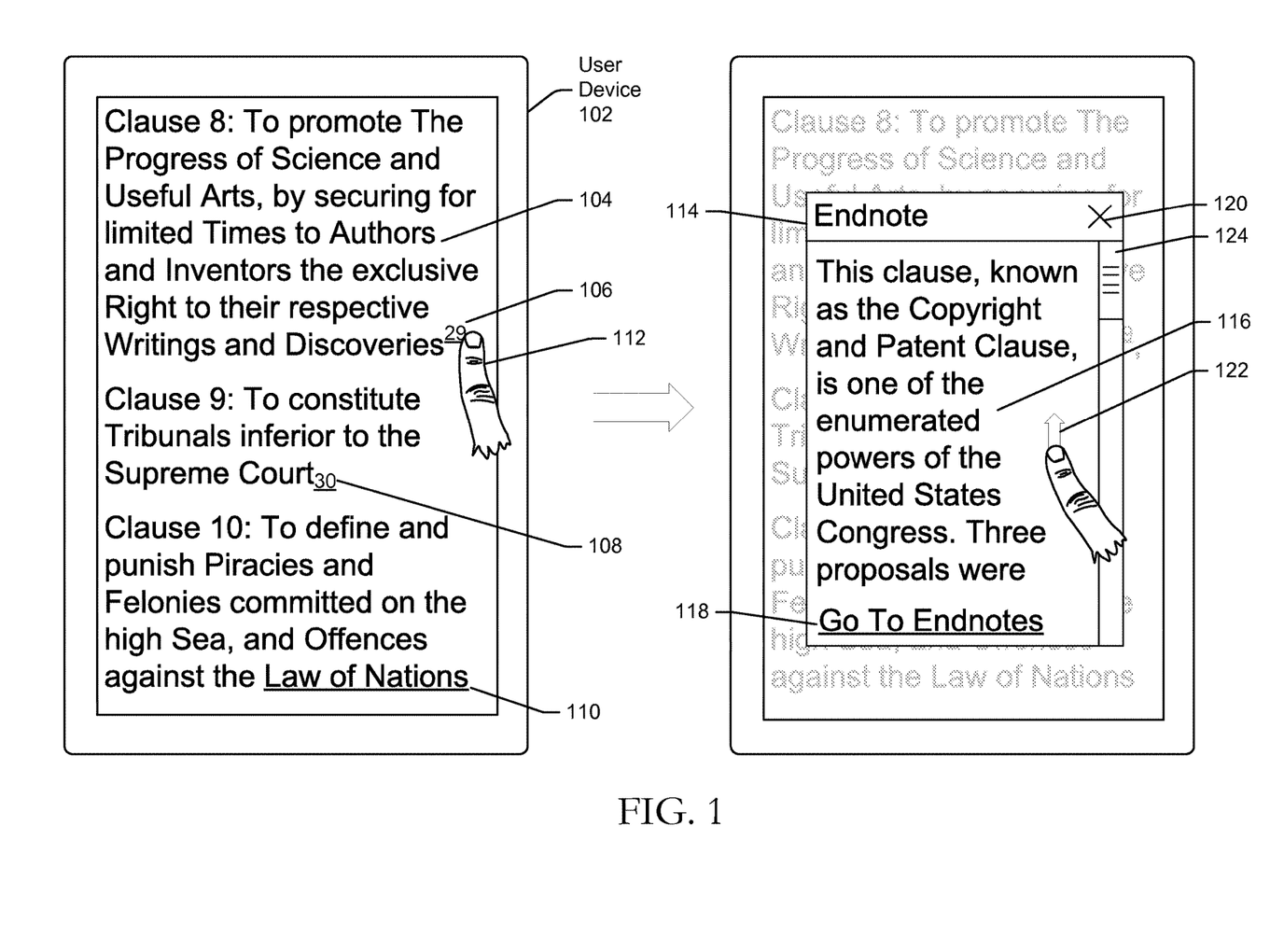
FIG. 1 is a schematic block diagram of an illustrative use case in accordance with one or more example embodiments of the disclosure.

FIG. 1 is a schematic block diagram of an illustrative use case in accordance with one or more example embodiments of the disclosure. FIG. 1 depicts an illustrative user device 102. Digital content 104 may be rendered on a display of the user device 102. The digital content 104 may be e-book content corresponding to one or more locations including a first location in the e-book.

The content 104 may include various links 106, 108, and 110 rendered in any of a variety of ways. For example, a link 106 may be rendered as a superscript in association with a particular portion of the content 104 and/or a link 108 may be rendered as a subscript in association with another portion of the content 104. In addition, a link 110 is shown that corresponds to a linked portion of text of the content 104. Various indicia may be rendered to indicate to a user that a link is present and selectable. For example, the links 106, 108, and 110 may be underlined and rendered in a different color in order to distinguish them as links that point to other content. It should be appreciated that not all of the types of links shown in FIG. 1 may be rendered as part of the content 104.

A user may select a link (e.g., the link 106) in accordance with the capabilities of the device 102. For example, if the device 102 includes a touch-sensitive display, the user may apply a touch 112 or other gesture to the display to select the link 106. Alternatively, or additionally, a user may actuate physical cursor buttons (not shown) of the device 102 to navigate to and select the link 106.

In accordance with example embodiments of the disclosure, responsive to detection of a user selection 112 of the link 106 rendered at or otherwise corresponding to a first location in an e-book, algorithmic processing may be triggered for determining whether the link 106 references endnote content. FIG. 1 assumes that the algorithmic processing performed responsive to selection of the link 106 results in a determination that the link 106 references endnote content. More specifically, FIG. 1 assumes that a determination was made that the link 106 forms part of a pair of related links (e.g., a cyclic link) and that any filtering criteria that were evaluated were deemed satisfied.

Upon determining that the link 106 references endnote content, the endnote content may be extracted in accordance with an endnote content extraction process described herein. Once the endnote content has been extracted, it may be rendered in association with the content 104. For example, the endnote content 116 may be rendered in an overlay 114 over the content 104. In certain example embodiments, the endnote content 116 may be rendered in a pop-up window, dialog box, or the like. A mechanism 120 may be provided for closing the overlay 114, thereby returning the user to the content 104. In this manner, a current context may be maintained without having to redirect the user to a second location of the e-book that includes the endnote content.

In various example embodiments, a mechanism may be provided for allowing the user to scroll through the endnote content. For example, if the device 102 includes a touch-sensitive display, a user may scroll through the endnote content by applying a gesture 122 (e.g., a swipe) to the display. Additionally, or alternatively, a scroll bar 124 or the like may be provided that allows for free-form scrolling through the endnote content 116.

In certain example embodiments, a link 118 may be provided in connection with the rendered endnote content 116 that, responsive to selection, causes a user to be redirected to the second location that includes the endnote content. For example, in certain example embodiments, the endnote content 116 may include partial endnote content if, for example, a character limit for extraction was reached before the entire endnote content was extracted. Selection of the link 118 may redirect the user to the second location and allow the user to view the entire endnote content including that portion that may not have been rendered in the overlay 114.

Figure 2:
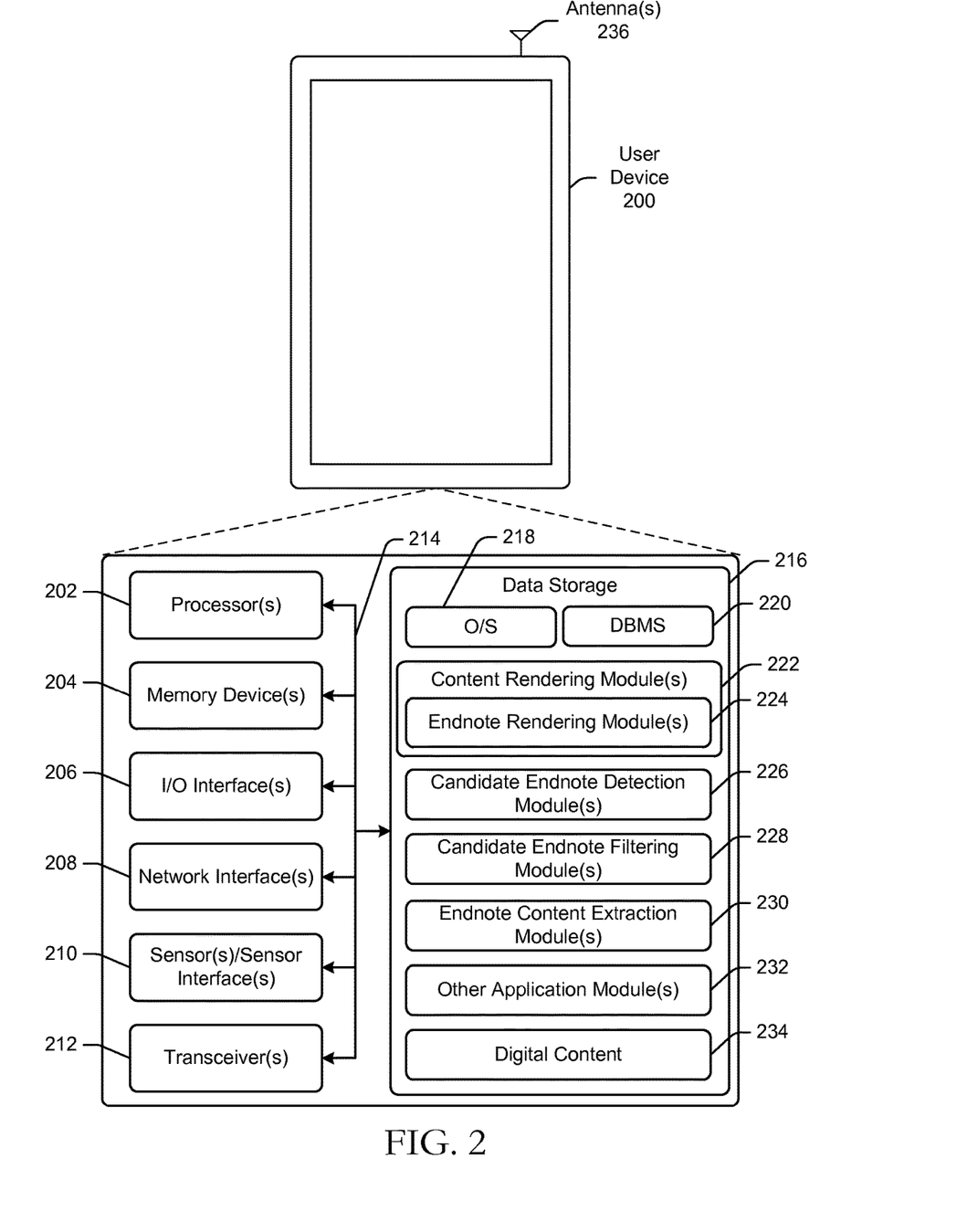
FIG. 2 is a schematic block diagram of an illustrative user device in accordance with one or more example embodiments of the disclosure.

FIG. 2 is a schematic block diagram of an illustrative user device 200 in accordance with one or more example embodiments of the disclosure. The user device 200 may include any suitable computing device including, but not limited to, a mobile device such as a smartphone, tablet, e-reader, or the like; a desktop computer; a laptop computer; and so forth. The user device 200 may represent an illustrative device configuration for the user device 102.

The device 200 may be configured to communicate via one or more networks (not shown) with one or more servers, user devices, or the like. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the device 200 may include one or more processors (processor(s)) 202, one or more memory devices 204 (generically referred to herein as memory 204), one or more input/output ("I/O") interface(s) 206, one or more network interfaces 208, one or more sensors or sensor interfaces 210, one or more transceivers 212, and data storage 216. The device 200 may further include one or more buses 214 that functionally couple various components of the device 200. The device 200 may further include one or more antennas 236 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 214 may include at least one of a system bus, a memory bus, an address bus, or a message bus, and may permit exchange of information (e.g., data (including computer-executable code), signaling, etc.) between various components of the device 200. The bus(es) 214 may include, without limitation, a memory bus or a memory controller, a peripheral bus, an accelerated graphics port, and so forth. The bus(es) 214 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 204 of the device 200 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 204 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 204 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 216 may include removable storage and/or non-removable storage including, but not limited to, magnetic storage, optical disk storage, and/or tape storage.

The data storage 216 may provide non-volatile storage of computer-executable instructions and other data. The memory 204 and the data storage 216, removable and/or non-removable, are examples of computer-readable storage media (CRSM) as that term is used herein.

The data storage 216 may store computer-executable code, instructions, or the like that may be loadable into the memory 204 and executable by the processor(s) 202 to cause the processor(s) 202 to perform or initiate various operations. The data storage 216 may additionally store data that may be copied to memory 204 for use by the processor(s) 202 during the execution of the computer-executable instructions. Moreover, output data generated as a result of execution of the computer-executable instructions by the processor(s) 202 may be stored initially in memory 204, and may ultimately be copied to data storage 216 for non-volatile storage.

More specifically, the data storage 216 may store one or more operating systems (O/S) 218; one or more database management systems (DBMS) 220; and one or more program modules, applications, or the like such as, for example, one or more content rendering modules 222, one or more candidate endnote detection modules 226, one or more candidate endnote filtering modules 228, one or more endnote content extraction modules 230, and one or more other application modules 232. Any of the program modules may include one or more sub-modules. For example, the content rendering module(s) 222 may include one or more endnote rendering module(s) 224. In addition, the data storage 216 may store various other types of data such as, for example, digital content data 234. Any of the modules depicted in FIG. 2 may include computer-executable code, instructions, or the like that may be loaded into the memory 204 for execution by one or more of the processor(s) 202. Further, any data (e.g., digital content data 234) may be loaded into the memory 204 for use by the processor(s) 202 in executing computer-executable code. For example, the digital content data 234 may be loaded from the data storage 216 to the memory 204 to facilitate rendering of the digital content by one or more of the processor(s) 202.

The processor(s) 202 may be configured to access the memory 204 and execute computer-executable instructions loaded therein. For example, the processor(s) 202 may be configured to execute computer-executable instructions of the various program modules of the user device 200 to cause or facilitate various operations to be performed in accordance with one or more embodiments of the disclosure. The processor(s) 202 may include any suitable processing unit capable of accepting data as input, processing the input data in accordance with stored computer-executable instructions, and generating output data. The processor(s) 202 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 202 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 202 may be capable of supporting any of a variety of instruction sets.

Referring now to functionality supported by the various program modules depicted in FIG. 2, the content rendering module(s) 222 may include computer-executable instructions, code, or the like that responsive to execution by one or more of the processor(s) 202 may cause content (e.g., the digital content 234) to be rendered on a display of the device 200. It should be appreciated that content may be output in various other forms (e.g., visual output, audible output, haptic output, etc.) responsive to execution of computer-executable instructions of the content rendering module(s) 222.

The endnote rendering module(s) 224 may include computer-executable instructions, code, or the like that responsive to execution by one or more of the processor(s) 202 may cause endnote content (or other content that is referenced by a selected link) to be rendered. The endnote content may be rendered, for example, within an overlay that is rendered over other content currently being displayed on a display of the device 200. In certain example embodiments, the content rendering module(s) 222 may include a first rendering engine for rendering content (e.g., e-book content), and the endnote rendering module(s) 224 may include a second rendering engine for rendering endnote content in association with content currently displayed on the device 200.

The candidate endnote detection module(s) 226 may include computer-executable instructions, code, or the like that responsive to execution by one or more of the processor(s) 202 may cause algorithmic processing to be performed for determining whether a selected link associated with a first location in digital content points to a second location that, in turn, includes or is "nearby" to a back link that points to the first location or a "nearby" location. Stated differently, responsive to execution of computer-executable instructions of the candidate endnote detection module(s) 226, algorithmic processing to determine whether a selected link forms part of a pair of related links (e.g., a cyclic link) may be performed.

The candidate endnote filtering module(s) 228 may include computer-executable instructions, code, or the like that responsive to execution by one or more of the processor(s) 202 may cause algorithmic processing to be performed to evaluate whether one or more filtering criteria are satisfied. The filtering criteria may include, for example, any of the criteria described herein.

If it is determined, from the algorithmic processing performed responsive to execution of computer-executable instructions of the candidate endnote filtering module(s) 228, that a selected link references an endnote, computer-executable instructions, code, or the like of the endnote content extraction module(s) 230 may be executed by one or more of the processor(s) 202 to initiate extraction of the endnote content. Upon completion of the extraction process, the endnote content may be rendered responsive to execution of computer-executable instructions of the endnote rendering module(s) 224.

The other application module(s) 232 may include computer-executable instructions, code, or the like that responsive to execution by one or more of the processor(s) 202 may cause any of a variety of application processing to be performed. The other application module(s) 232 may form part of, for example, word processing applications, mobile applications, navigation applications, browser applications, and so forth.

The O/S 218 may be loaded from the data storage 216 into the memory 204 and may provide an interface between other application software executing on the device 200 and hardware resources of the device 200. More specifically, the 0/S 218 may include a set of computer-executable instructions for managing hardware resources of the device 200 and for providing common services to other application programs (e.g., managing memory allocation among various application programs). The O/S 218 may include any operating system now known or which may be developed in the future including, but not limited to, any server operating system, any mainframe operating system, or any other proprietary or non-proprietary operating system.

The DBMS 220 may be loaded into the memory 204 and may support functionality for accessing, retrieving, storing, and/or manipulating data stored in the memory 204 and/or data stored in the data storage 216. The DBMS 220 may use any of a variety of database models (e.g., relational model, object model, etc.) and may support any of a variety of query languages. The DBMS 220 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the device 200 is a mobile device, the DBMS 220 may be any suitable light-weight DBMS optimized for performance on a mobile device.

Referring now to other illustrative components of the device 200, one or more input/output (I/O) interfaces 206 may be provided that may facilitate the receipt of input information by the device 200 from one or more I/O devices as well as the output of information from the device 200 to the one or more I/O devices. The I/O devices may include, for example, one or more user interface devices that facilitate interaction between a user and the device 200 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth.

The device 200 may further include one or more network interfaces 208 via which the device 200 may communicate with any of a variety of other systems, platforms, networks, devices, and so forth. Such communication may occur via any of the types of networks previously described.

The antenna(s) 236 may include any suitable type of antenna depending, for example, on the communications protocols used to transmit or receive signals via the antenna(s) 236. Non-limiting examples of suitable antennas may include directional antennas, non-directional antennas, dipole antennas, folded dipole antennas, patch antennas, multiple-input multiple-output (MIMO) antennas, or the like. The antenna(s) 236 may be communicatively coupled to one or more transceivers 212 or radio components to which or from which signals may be transmitted or received.

As previously described, the antenna(s) 236 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 236 may additionally, or alternatively, include a Wi-Fi antenna configured to transmit or receive signals in accordance with established standards and protocols, such as the IEEE 802.11 family of standards, including via 2.4 GHz channels (e.g. 802.11b, 802.11g, 802.11n), 5 GHz channels (e.g. 802.11n, 802.11ac), or 60 GHZ channels (e.g. 802.11ad). In alternative example embodiments, the antenna(s) 236 may be configured to transmit or receive radio frequency signals within any suitable frequency range forming part of the unlicensed portion of the radio spectrum.

The antenna(s) 236 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 212 may include any suitable radio component(s) for—in cooperation with the antenna(s) 236—transmitting or receiving radio frequency (RF) signals in the bandwidth and/or channels corresponding to the communications protocols utilized by the device 200 to communicate with other devices. The transceiver(s) 212 may include hardware, software, and/or firmware for modulating, transmitting, or receiving—potentially in cooperation with any of antenna(s) 236—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 212 may further include hardware, firmware, or software for receiving GNSS signals. The transceiver(s) 212 may include any known receiver and baseband suitable for communicating via the communications protocols utilized by the device 200. The transceiver(s) 212 may further include a low noise amplifier (LNA), additional signal amplifiers, an analog-to-digital (A/D) converter, one or more buffers, digital baseband, or the like.

The sensor(s)/sensor interface(s) 210 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

It should be appreciated that the program modules, applications, computer-executable instructions, code, or the like depicted in FIG. 2 as being stored in the data storage 216 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the device 200, and/or hosted on other computing device(s) accessible via one or more networks, may be provided to support functionality provided by the program modules, applications, or computer-executable code depicted in FIG. 2 and/or additional or alternate functionality. Further, functionality may be modularized differently such that processing described as being supported collectively by the collection of program modules depicted in FIG. 2 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 2 may be implemented, at least partially, in hardware and/or firmware across any number of devices.

It should further be appreciated that the device 200 may include alternate and/or additional hardware, software, or firmware components beyond those described or depicted without departing from the scope of the disclosure. More particularly, it should be appreciated that software, firmware, or hardware components depicted as forming part of the device 200 are merely illustrative and that some components may not be present or additional components may be provided in various embodiments. While various illustrative program modules have been depicted and described as software modules stored in data storage 216, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Illustrative Processes

Figure 3:
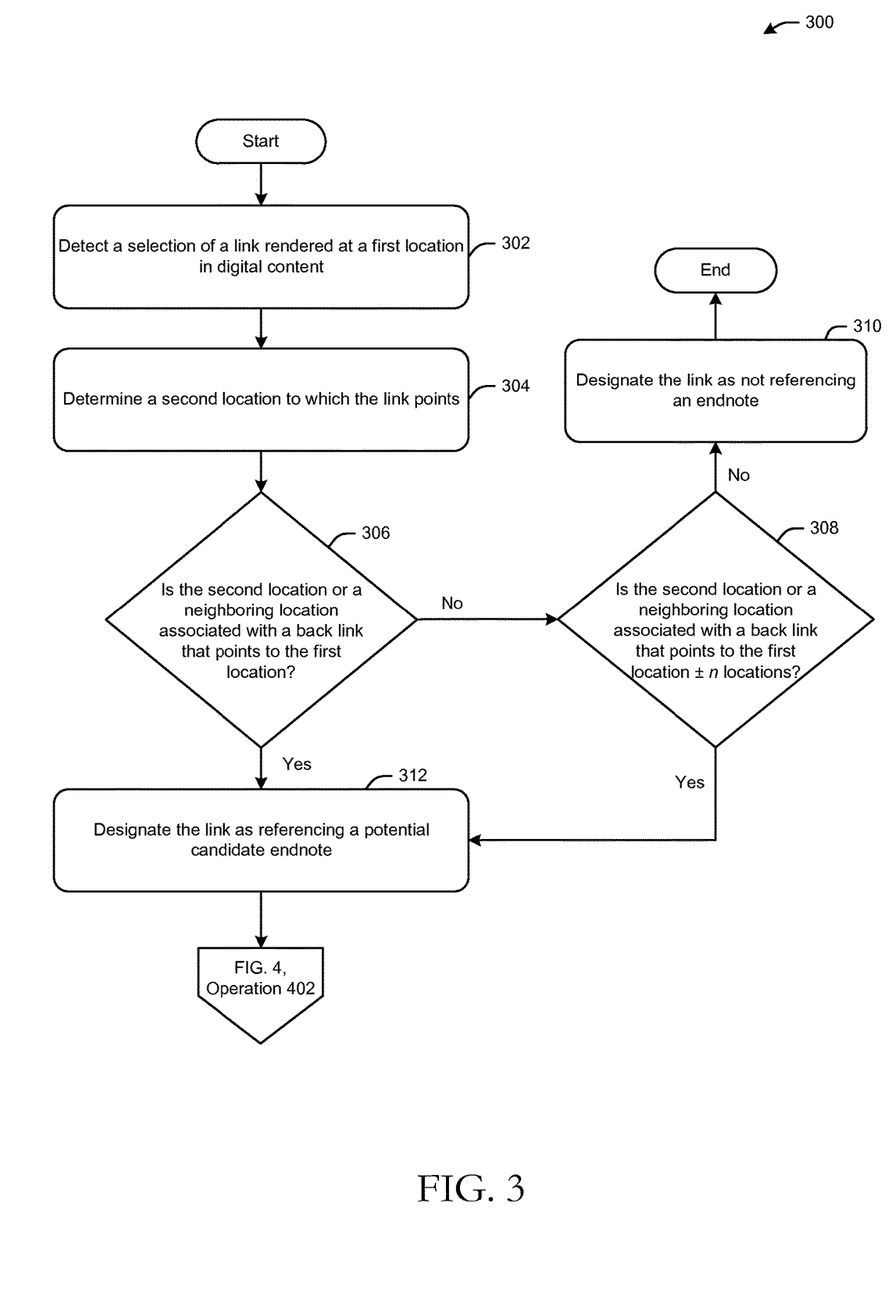
FIG. 3 is a process flow diagram of an illustrative method for identifying potential candidate endnotes in accordance with one or more example embodiments of the disclosure.

FIG. 3 is a process flow diagram of an illustrative method 300 for identifying potential candidate endnotes in accordance with one or more example embodiments of the disclosure. In certain example embodiments, the method 300 may be performed to determine whether a selected link in an e-book forms part of a pair of related links such as, for example, a cyclic link. While the operations of method 300 may be described in the illustrative context of an e-book, it should be appreciated that the method 300 is more broadly applicable to other types of digital content.

At block 302, computer-executable instructions of the candidate endnote detection module(s) 226 may be executed to detect a selection of a link rendered at a first location in an e-book. The selected link will hereinafter be referred to as a "first link" The first link may have been rendered as part of the rendering of other content associated with the first location and/or one or more other locations in the e-book.

At block 304, computer-executable instructions of the candidate endnote detection module(s) 226 may be executed to determine a second location to which the first link points. More specifically, computer-executable instructions of the candidate endnote detection module(s) 226 may be executed to make a call to a rendering engine, which responsive to the call, may return a response that identifies the second location to which the first link points. In certain example embodiments, the algorithmic processing of method 300 (and optionally methods 400 and 500 depicted in FIGS. 4 and 5, respectively) may be performed at least partially concurrently with a rendering of content that includes the first link or at least partially concurrently with a rendering of the content to which the first link points. It should be appreciated, however, that in certain example embodiments, the algorithmic processing of methods 300, 400, and/or 500 may not be performed at rendering time.

At block 306, computer-executable instructions of the candidate endnote detection module(s) 226 may be executed to determine whether the second location includes, or is otherwise associated with, a back link that points to the first location. The back link will be hereinafter referred to as a "second link." In response to a negative determination at block 306, the method 300 may proceed to block 308, where a determination may be made as to whether the second location includes, or is otherwise associated with, a second link that points to a location that is "nearby" to the first location (e.g., within a threshold number (n) of locations from the first location). The threshold number n may be any suitable number (e.g., 5) and may be predetermined or determined as a function of the language of the e-book, the subject matter or genre to which the e-book relates, or the like.

The determination at block 308 may be made in order to account for the possibility that the second link does not form a cyclic link with the first link, but that the first link and the second link are nonetheless part of a pair of related links. This may occur for any number of reasons such as, for example, a loss of precision that occurs as a result of the conversion of content element positions to content element locations. For example, a character (e.g., a foreign language character in Unicode) may correspond to multiple bytes, and thus, multiple positions in an internal representation of the e-book content. Such a character may, in certain example embodiments, be converted to and represented at a single location. In addition, the conversion of a position to a corresponding location may involve mathematical manipulation that may yield non-integer values, in which case, the values may be truncated or rounded, thereby potentially resulting in loss of precision. This loss of precision may cause links that are cyclic in the internal representation of e-book content to become slightly non-cyclic in the location representation. Accordingly, the determination at block 308 may account for this potential loss of precision.

In response to a negative determination at block 308, the method 300 may proceed to block 310, where computer-executable instructions of the candidate endnote detection module(s) 226 may be executed to designate the first link as not referencing endnote content, and the method 300 may end. In certain example embodiments, negative determinations at blocks 306 and 308 may occur if the second location does not include a back link at all. In other example embodiments, the second location may include a back link, but negative determinations may nonetheless occur at blocks 306 and 308 if the back link does not point to the first location or a "nearby" location. A back link may exist but not point to the first location or a "nearby" location if, for example, another link at a location that is distant from the first location points to the second location.

On the other hand, in response to a positive determination at block 306 or a positive determination at block 308, the method 300 may proceed to block 312, and computer-executable instructions of the candidate endnote detection module(s) 226 may be executed to designate the first link as referencing a potential candidate endnote. Stated differently, if a determination is made that the second location includes a second link that points to the first location or to a "nearby" location, or if a determination is made that the second link is at a neighboring location (e.g., a location that is ±r locations from the second location), the first link and the second link may form part of a pair of related links (potentially a cyclic link), and thus, the first link may be designated as referencing a potential candidate endnote.

Figure 4:
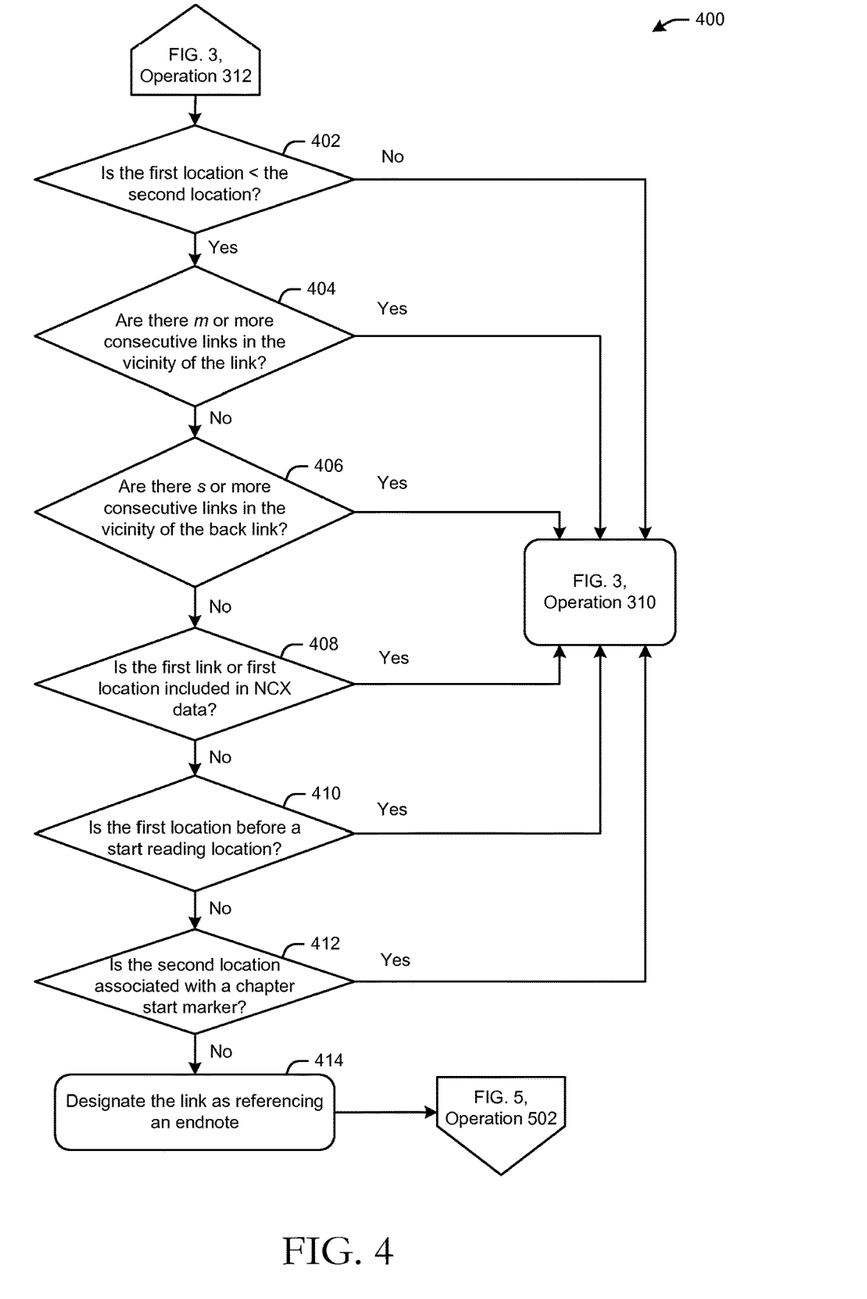
FIG. 4 is a process flow diagram of an illustrative method for filtering potential candidate endnotes to identify endnotes for extraction in accordance with one or more example embodiments of the disclosure.

FIG. 4 is a process flow diagram of an illustrative method 400 for filtering potential candidate endnotes to identify endnotes for extraction in accordance with one or more example embodiments of the disclosure. The method 400 may include algorithmic processing to evaluate various filtering criteria to determine if a potential candidate endnote will, in fact, be assumed to be an endnote. That is, if it is determined that a selected link forms part of a pair of related links based on the algorithmic processing of method 300, method 400 may be performed to determine whether various filtering criteria are satisfied. Satisfaction of the filtering criteria may represent an increased likelihood that content associated with a back link to the selected link is, in fact, endnote content prior to initiating an extraction of the content. While the operations of method 400 may be described in the illustrative context of an e-book, it should be appreciated that the method 400 is more broadly applicable to other types of digital content. Furthermore, while example filtering criteria are depicted in and described with respect to FIG. 4, it should be appreciated that not all of the filtering criteria may be evaluated in certain example embodiments and/or additional filtering criteria not depicted may also be evaluated. Further, the filtering criteria may not be evaluated in the order depicted.

At block 402, computer-executable instructions of the candidate endnote filtering module(s) 228 may be executed to determine whether the first location appears earlier in the e-book than the second location. More specifically, in certain example embodiments, the first location may be associated with a first value and the second location may be associated with a second value. Accordingly, a determination may be made, at block 402, as to whether the first value is less than the second value. In response to a negative determination at block 402, the method 400 may proceed to block 310 of method 300, and the selected link may be designated as not referencing endnote content. A negative determination may occur at block 402 if, for example, the second link is included in a table of contents of an e-book, the second link is associated with the start of a new section or chapter of the e-book, or the second location includes other content of the e-book that does not include endnote content corresponding to the first link. For example, in certain example embodiments, various portions of the text of an e-book may be linked together even if none of the portions included endnote content.

On the other hand, in response to a positive determination at block 402, the method 400 may proceed to block 404, where computer-executable instructions of the candidate endnote filtering module(s) 228 may be executed to determine whether a number of consecutive links in the vicinity of the first link meets or exceeds a first threshold value (m). The "vicinity" of a link may include the location of the link and one or more adjacent locations. In response to a positive determination at block 404 (e.g., if a number of consecutive links in the vicinity of the first link is greater than or equal to the first threshold value m), the method 400 may proceed to block 310 of method 300, and the first link may be designated as not referencing endnote content.

On the other hand, in response to a negative determination at block 404, the method 400 may proceed to block 406, where computer-executable instructions of the candidate endnote filtering module(s) 228 may be executed to determine whether a number of consecutive links in the vicinity of the second link meets or exceeds a second threshold value (s). In response to a positive determination at block 406 (e.g., if a number of consecutive links in the vicinity of the second link is greater than or equal to the second threshold value s), the method 400 may proceed to block 310 of method 300, and the first link may be designated as not referencing endnote content.

The operation at block 404 may be performed by scanning the e-book content from the start of a first location corresponding to the first link to the start (or end) of a second subsequent location in the e-book. Similarly, the operation at block 406 may be performed by scanning the e-book content from the start of a second location corresponding to the second link to the start (or end) of a second subsequent location in the e-book. Any suitable number of subsequent locations after the first location or the second location may be scanned.

In those example embodiments in which a threshold number of consecutive links is not detected by scanning forward from the first location, previous locations may be scanned by selecting a particular previous location and scanning forwards from that location until the first location is reached. This approach may be employed if, for example, limitations exist on scanning e-book content backwards. The particular previous location from which to begin scanning may be determined by subtracting an offset (e.g., a predetermined number of locations) from the first location. In certain example embodiments, if scanning from a first previous location does not yield a threshold number of consecutive links, an even earlier location may be selected by, for example, subtracting a multiple of the offset from the first location. The e-book content may then be scanned from that even earlier location. For example, a previous location from which to scan forward until the first location is reached may be represented as follows: loc(first link)–y*offset, where offset=a predetermined number of locations, and where y=1, 2, . . . j. It should be appreciated that a previous location may similarly be selected to enable scanning locations before the second location in connection with the operation at block 406.

The first and second threshold values, m and s respectively, may be selected based on the language of the e-book, the subject matter or genre to which the e-book relates, or the like, and may be the same value or different values. If the number of consecutive links in the vicinity of the first link is greater than or equal to the first threshold value m (e.g., a positive determination at block 404), the first link may be part of a table of contents of the e-book, and thus, may point to the start of a new chapter or section. Similarly, if the number of consecutive links in the vicinity of the second link is greater than or equal to the second threshold value s, the second link may be part of an index of the e-book.

Referring again to block 406, in response to a negative determination, the method 400 may proceed to block 408, where computer-executable instructions of the candidate endnote filtering module(s) 228 may be executed to determine whether the first link (or the first location) is included in an NCX file. The NCX file may specify table of contents data, data identifying various sections of the e-book (e.g., chapters), or the like. Not all e-books may include an NCX file, and thus, the filtering criterion represented by block 408 may not be evaluated in certain example embodiments.

In response to a positive determination at block 408 (e.g., if the first link or the first location is included as an entry in an NCX file associated with the e-book), the method 400 may proceed to block 310 of method 300, and the first link may be designated as not referencing endnote content. If, however, the first link or the first location is not included in NCX data, or in other words, in response to a negative determination at block 408, the method 400 may proceed to block 410, where computer-executable instructions of the candidate endnote filtering module(s) 228 may be executed to determine whether the first location appears after a start reading location of the e-book.

In response to a positive determination at block 410, the method 400 may proceed to block 310 of method 300, and the first link may be designated as not referencing endnote content. The first location may appear before a start reading location of the e-book if, for example, the first location corresponds to a table of contents of the e-book, a preface of the e-book, or the like. If, however, the first location does not appear before a start reading location, or in other words, in response to a negative determination at block 410, the method 400 may proceed to block 412, where computer-executable instructions of the candidate endnote filtering module(s) 228 may be executed to determine whether the second location is associated with a chapter start marker of the e-book.

In response to a positive determination at block 412, the method 400 may proceed to block 310 of method 300, and the first link may be designated as not referencing endnote content. If, however, the second location is not associated with a chapter start marker, or in other words, in response to a negative determination at block 412, the method 400 may proceed to block 414, where computer-executable instructions of the candidate endnote filtering module(s) 228 may be executed to designate the first link as referencing an endnote. In certain example embodiments, block 414 may be reached if all filtering criteria that are evaluated have been satisfied.

Figure 5:
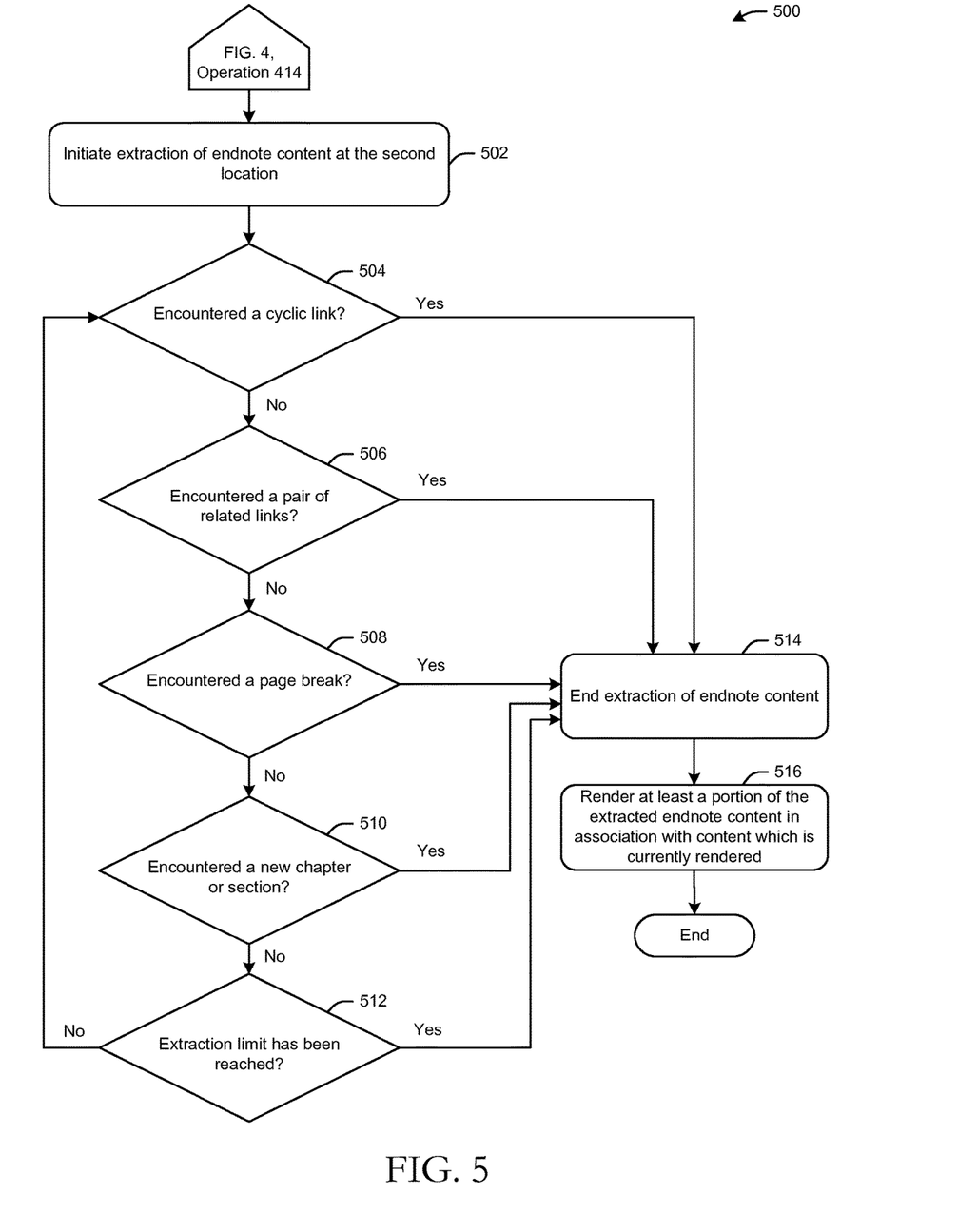
FIG. 5 is a process flow diagram of an illustrative method for extracting endnote content and presenting the endnote content in association with rendered content in accordance with one or more example embodiments of the disclosure.

FIG. 5 is a process flow diagram of an illustrative method 500 for extracting endnote content and presenting the endnote content in association with rendered content in accordance with one or more example embodiments of the disclosure. In certain example embodiments, the endnote content extraction process of method 500 may be performed responsive to the designation of a selected link as referencing endnote content (e.g., if block 414 is reached as a result of the algorithmic processing of methods 300 and 400). While the operations of method 500 may be described in the illustrative context of an e-book, it should be appreciated that the method 500 is more broadly applicable to other types of digital content.

At block 502, computer-executable instructions of the endnote content extraction module(s) 230 may be executed to initiate extraction of the endnote content at the second location. The extraction process may continue until a halt condition is detected, at which point, the extraction process may cease. Any of a variety of halt conditions may trigger a cessation of the endnote content extraction such as those depicted at blocks 504-512. It should be appreciated that processing to determine whether a halt condition exists may not occur in the order depicted in FIG. 5. Further, each of the halt conditions depicted in FIG. 5 may not be evaluated.

At block 504, computer-executable instructions of the endnote content extraction module(s) 230 may be executed to determine if another link has been encountered that forms part of a cyclic link. In order to make the determination at block 504, the endnote content extraction module(s) 230 may leverage one or more other program modules (e.g., the candidate endnote detection module(s) 226). For example, the algorithmic process of method 300 may be performed to determine whether any link that is encountered during the endnote content extraction process forms part of a cyclic link. In response to a positive determination at block 504, the method 500 may proceed to block 514, and the endnote content extraction process may cease.

On the other hand, in response to a negative determination at block 504, computer-executable instructions of the endnote content extraction module(s) 230 may be executed at block 506 to determine if another link has been encountered that forms part of a pair of related links. In order to make the determination at block 506, the endnote content extraction module(s) 230 may leverage one or more other program modules (e.g., the candidate endnote detection module(s) 226). For example, the algorithmic process of method 300 may be performed to determine whether any link that is encountered during the endnote content extraction process forms part of a pair of related links. In response to a positive determination at block 506, the method 500 may proceed to block 514, and the endnote content extraction process may cease.

That is, as long as no cyclic link is detected or no non-cyclic pair of related links is detected, the method 500 may proceed to block 508, where computer-executable instructions of the endnote content extraction module(s) 230 may be executed to determine whether a page break has been encountered. A page break may be defined in the content of an e-book and may indicate an end to the current context. For example, if the endnote being extracted is the last endnote for a particular chapter or section, a page break may be provided to ensure that subsequent content (e.g., the start of a new chapter or section) is rendered as part of a separate screen image. In response to a positive determination at block 508, the method 500 may proceed to block 514, and the endnote content extraction process may cease. The operation of block 508 may serve to halt the endnote extraction process if, for example, no NCX data is provided for the e-book.

On the other hand, in response to a negative determination at block 508, that is, as long as no page breaks are encountered, the method 500 may proceed to block 510, where computer-executable instructions of the endnote content extraction module(s) 230 may be executed to determine whether a new section or chapter of the e-book is encountered. In response to a positive determination at block 510, the method 500 may proceed to block 514, and the endnote content extraction process may cease. For example, if a new entry is encountered in the NCX data that indicates the start of a new chapter or section, this may indicate that the current context has ended, and the endnote content extraction may cease.

On the other hand, in response to a negative determination at block 510, that is, as long as a new chapter or section is not encountered, the method 500 may proceed to block 512, where computer-executable instructions of the endnote content extraction module(s) 230 may be executed to determine whether an extraction limit has been reached. The extraction limit may be a threshold number of characters (e.g., 2000 characters) that can be extracted or a threshold number of locations (e.g., 200 locations) across which the endnote content is extracted. A character may be defined differently depending on the language in which the e-book is represented and rendered. For example, certain languages (e.g., Japanese, Chinese, etc.) may have multi-byte characters, while other languages (e.g., languages based on the Latin alphabet) may have single-byte characters. If it is determined that an extraction limit has been reached, that is, in response to a positive determination at block 512, the method 500 may proceed to block 514, and the endnote extraction process may cease. On the other hand, if the extraction limit has not been reached, or in other words, responsive to a negative determination at block 512, the method 500 may proceed again to block 504. The operations represented by blocks 504-512 may be performed iteratively until one of the halt conditions is satisfied.

Upon cessation of the endnote content extraction process, the method 500 may proceed to block 516, where computer-executable instructions of the endnote rendering module(s) 224 may be executed to render at least a portion of the endnote content in association with other content at the first location (e.g., current content rendered on a display of the device). The current content may include the first link (the link that was selected) as well as other e-book content associated with the first location and/or one or more other locations. The endnote content may be rendered in accordance with any of the mechanisms described herein such as, for example, in an overlay.

One or more operations of the methods 300, 400, or 500 may have been described above as being performed by a device 200, or more specifically, by one or more program modules, applications, or the like executing on such the device 200. It should be appreciated, however, that any of the operations of methods 300, 400, or 500 may be performed, at least in part, in a distributed manner by one or more other devices, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods 300, 400, or 500 may be described in the context of the illustrative device 200, it should be appreciated that such operations may be implemented in connection with numerous other device configurations.

The operations described and depicted in the illustrative methods of FIGS. 3-5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 3-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method, comprising:
    detecting a user selection of a first link corresponding to a first location in a first portion of digital content;
    determining, by one or more computers comprising one or more processors, that the first link points to a second location in a second portion of the digital content;
    determining, by the one or more computers, that the second location is associated with a second link that points to a third location;
    determining, by the one or more computers, that the third location is within a number of locations from the first location within the digital content;
    determining, by the one or more computers, that the first location is before the second location in a sequence of locations of the digital content;
    determining, by the one or more computers, based at least in part on the third location being within the number of locations from the first location and the first location being before the second location, that the second location is associated with endnote content referenced by the first link and at least partially concurrently with a rendering of at least the first portion; and
    rendering, by the one or more computers, at least a portion of the endnote content as an overlay over the at least the first portion that has been rendered.

2. The method of claim 1, further comprising:
    converting, by the one or more computers, a plurality of byte positions representing a single character to a corresponding fourth location for display,
    wherein the third location is different from the first location based at least in part on converting the plurality of byte positions to the fourth location.

3. The method of claim 1, further comprising:
    determining that a number of consecutive links associated with the first location, and at least one location offset from the first location by a first offset value, meets or exceeds a first threshold value, wherein determining that the second location is associated with the endnote content referenced by the first link is further based at least in part on the number of consecutive links associated with the first location and the at least one location offset from the first location meeting or exceeding the first threshold value; or
    determining that a number of consecutive links associated with the second location, and at least one location offset from the second location by a second offset value, meets or exceeds a second threshold value, wherein determining that the second location is associated with the endnote content referenced by the first link is further based at least in part on the number of consecutive links associated with the second location and the at least one location offset from the second location meeting or exceeding the second threshold value.

4. The method of claim 1, further comprising identifying the endnote content, wherein identifying the endnote content comprises:
    initiating extraction of the endnote content at the second location;
    determining, by the one or more computers, that a halt condition is satisfied, wherein the halt condition indicates that an end of the endnote content has been reached or that a character extraction limit has been reached; and
    halting, by the one or more computers, extraction of the endnote content responsive, at least in part, to determining that the halt condition is satisfied,
    wherein the at least a portion of the endnote content is rendered responsive, at least in part, to halting of the extraction of the endnote content.

5. A method, comprising:
    determining, by one or more computers comprising one or more processors and at least partially concurrently with a rendering of a first portion of digital content, that a first link corresponding to a first location in the first portion points to a second location in a second portion of the digital content, wherein the second portion is associated with a second link that points to a third location;
    determining, by the one or more computers, that the third location is within a number of locations from the first location within the digital content; and
    determining, by the one or more computers, that the first location is before the second location in a sequence of locations of the digital content; and
    determining, by the one or more computers, based at least in part on the third location being within the number of locations from the first location within the digital content and the first location being before the second location that the second location is associated with endnote content.

6. The method of claim 5, wherein the third location is the first location, and wherein the first link and the second link form a cyclic link.

7. The method of claim 5, further comprising determining, by the one or more computers, that the first location is assigned a first value that is less than a second value assigned to the second location, wherein determining that the second location is associated with endnote content is further based at least in part on the first value being less than the second value.

8. The method of claim 5, further comprising determining, by the one or more computers, that a number of consecutive links corresponding to at least the first location does not meet or exceed a threshold value, wherein determining that the second location is associated with endnote content is further based at least in part on the number of consecutive links not meeting or exceeding the threshold value.

9. The method of claim 5, further comprising determining that a number of consecutive links corresponding to at least the second location does not meet or exceed a threshold value, wherein determining that the second location is associated with endnote content is further based at least in part on the number of consecutive links not meeting or exceeding the threshold value.

10. The method of claim 5, further comprising determining, by the one or more computers, that the first location is not included within a predetermined range of locations in the digital content, wherein the predetermined range of locations includes content associated with a table of contents of the digital content, wherein determining that the second location is associated with endnote content is further based at least in part on the first location not being included within the predetermined range of locations.

11. The method of claim 5, further comprising determining, by the one or more computers, that the first location is assigned a first value that is greater than a second value assigned to a content consumption start location, wherein determining that the second location is associated with endnote content is further based at least in part on the first value being greater than the second value.

12. The method of claim 5, further comprising determining, by the one or more computers, that the second location does not correspond to a start location of a particular section of the digital content, wherein determining that the second location is associated with endnote content is further based at least in part on the second location not corresponding to the start location.

13. The method of claim 5, wherein the endnote content is first endnote content, the method further comprising:
determining, by the one or more computers, that a third link corresponding to a third location and a fourth link corresponding to a fourth location are related links, wherein the fourth link points to a fifth location;
determining that the fifth location is not within a number of locations from the third location; and
determining, by the one or more computers, based at least in part on the fifth location not being within the number of locations from the third location, that the fourth location is not associated with second endnote content.

14. The method of claim 13, further comprising determining, by the one or more computers, that a third value assigned to the third location is greater than a fourth value assigned to the fourth location, wherein determining that the fourth location is not associated with second endnote content is further based at least in part on the third value being greater than the fourth value.

15. The method of claim 13, further comprising determining, by the one or more computers, that a number of links corresponding to at least the third location meets or exceeds a first threshold value, wherein determining that the fourth location is associated with second endnote content is further based at least in part on the number of links corresponding to at least the third location meeting or exceeding the first threshold value, or determining, by the one or more computers, that a number of links corresponding to at least the fourth location meets or exceeds a second threshold value, wherein determining that the fourth location is associated with second endnote content is further based at least in part on the number of links corresponding to at least the fourth location meeting or exceeding the second threshold value.

16. The method of claim 15, wherein determining that the number of links corresponding to at least the third location meets or exceeds the first threshold value comprises determining that the third link is included in a table of contents of the digital content, and wherein determining that the number of links corresponding to at least the fourth location meets or exceeds the second threshold value comprises determining that the second link is included in an index of the digital content.

17. The method of claim 5, wherein the portion of the digital content comprises at least a portion of the endnote content or content that includes the first link.

18. The method of claim 5, further comprising:
responsive to determining that the second location is associated with the endnote content, identifying, by the one or more computers, the endnote content and initiating, by the one or more computers, a rendering of at least a portion of the endnote content in an overlay over the existing rendered content.

19. The method of claim 5, wherein determining that the third location is within the number of locations from the first location within the digital content comprises:
determining the number of locations; and
determining that the number of locations is less than a location threshold associated with the number of locations, and wherein the third location precedes the second location.

20. A device, comprising:
at least one processor; and
at least one memory storing computer-executable instructions that, when executed by the at least one processor, cause the at least one processor to:
determine, at least partially concurrently with a rendering of a first portion of digital content, that a first link corresponding to a first location in the first portion points to a second location in a second portion of the digital content, wherein the second portion is associated with a second link that points to a third location;
determine that the third location is within a number of locations from the first location in the first portion within the digital content; and
determine that the first location is before the second location in a sequence of locations of the digital content; and
determine, based at least in part on the third location being within the number of locations from the first location within the digital content and the first location being before the second location that the second location is associated with endnote content that is eligible for rendering in connection with existing rendered content.

21. The device of claim 20, wherein the computer-executable instructions, when executed by the at least one processor, further cause the at least one processor to:
initiate extraction of the endnote content at the second location;
determine that a halt condition is satisfied during extraction of the endnote content;
halt extraction of the endnote content responsive to determining that the halt condition is satisfied; and
render at least a portion of the endnote content.

22. The device of claim 21, wherein, the computer-executable instructions, when executed by the at least one processor, cause the at least one processor to determine that the halt condition is satisfied by:
determining that a third link encountered during the extraction of the endnote content forms part of a pair of related links;
determining that a page break has been encountered during the extraction of the endnote content; or
determining that a new section of the digital content has been encountered during the extraction of the endnote content.

* * * * *